US008522955B2

(12) United States Patent
Petersen (10) Patent No.: US 8,522,955 B2
(45) Date of Patent: Sep. 3, 2013

(54) APPARATUS AND METHOD FOR FEEDING USED OBJECTS (75) Inventor: Henrik Juhl Petersen, Egtved (DK)

(73) Assignee: Anker Andersen A/S, Toerring (DK)

(*) Notice: Subject to any disclaimer, the term of this patent is extended or adjusted under 35 U.S.C. 154(b) by 413 days.

(21) Appl. No.: 12/937,532

(22) PCT Filed: Apr. 14, 2009

(86) PCT No.: PCT/DK2009/050084
§ 371 (c)(1),
(2), (4) Date: Nov. 18, 2010

(87) PCT Pub. No.: WO2009/124556
PCT Pub. Date: Oct. 15, 2009

(65) Prior Publication Data
US 2011/0048897 A1   Mar. 3, 2011

(30) Foreign Application Priority Data

Apr. 11, 2008 (DK) ................................ 2008 00528
Jul. 11, 2008 (DK) ................................ 2008 00975

(51) Int. Cl.
*B65G 47/14* (2006.01)
(52) U.S. Cl.
USPC ........................................................ 198/392
(58) Field of Classification Search
USPC .................................................. 198/391–396
See application file for complete search history.

(56) References Cited

U.S. PATENT DOCUMENTS

| 2,858,008 | A |   | 10/1958 | Dilts |
| 4,225,031 | A | * | 9/1980 | Frisbie et al. ................. 198/395 |
| 4,489,820 | A |   | 12/1984 | Schneider |
| 4,723,661 | A | * | 2/1988 | Hoppmann et al. .......... 209/658 |
| 4,768,639 | A | * | 9/1988 | Gamberini et al. ........... 198/392 |
| 4,828,100 | A | * | 5/1989 | Hoppmann et al. .......... 198/392 |
| 4,928,808 | A | * | 5/1990 | Marti ....................... 198/397.06 |

(Continued)

FOREIGN PATENT DOCUMENTS

| CH | 292970 A | 8/1953 |
| DE | 44 37 162 A1 | 4/1996 |

(Continued)

OTHER PUBLICATIONS

International Search Report for International Application No. PCT/DK2009/050084 Dated Jun. 22, 2009.

*Primary Examiner* — Douglas Hess
(74) *Attorney, Agent, or Firm* — Roberts Mlotkowski Safran & Cole, P.C.; David S. Safran (57) ABSTRACT

An apparatus for feeding objects, such as used beverage containers, to a recording and/or sorting unit with which the objects are supplied on a receiver and forwarded one by one with a predetermined orientation on at least one feeding conveyor. The receiver has at least one receiving table with at least one rotating disk, at least one feeding conveyor that is positioned tangentially relative to the at least one rotating disk, and a peripheral barrier essentially circumscribing at least a portion of the at least one receiving table. A related method involves the objects being provided on the at least one rotating disk and rotated it to thereby be aligned along the peripheral barrier that circumscribes at least a portion of the at least rotating disk. The aligned objects are then forwarded on the at least one feeding conveyor that is tangentially arranged relative to a rotating disk.

34 Claims, 11 Drawing Sheets

(56) References Cited

U.S. PATENT DOCUMENTS

| | | | |
|---|---|---|---|
| 5,853,077 A * | 12/1998 | Schmitt | 198/383 |
| 5,927,468 A * | 7/1999 | Corniani et al. | 198/394 |
| 5,954,184 A * | 9/1999 | Schmitt | 198/392 |
| 5,954,185 A * | 9/1999 | Eshelman et al. | 198/396 |
| 6,065,587 A | 5/2000 | Schindel | |
| 6,112,937 A * | 9/2000 | Takahashi et al. | 221/167 |
| 6,216,845 B1 * | 4/2001 | Polese | 198/398 |
| 6,612,417 B2 * | 9/2003 | Garvey | 198/443 |
| 6,691,855 B1 * | 2/2004 | Takahashi et al. | 198/396 |
| 7,258,222 B2 * | 8/2007 | Marti Sala et al. | 198/393 |
| 7,383,937 B2 * | 6/2008 | Perreault et al. | 198/392 |
| 7,669,707 B2 * | 3/2010 | Kenneway | 198/398 |
| 7,757,837 B2 * | 7/2010 | Jones | 198/778 |
| 8,096,403 B2 * | 1/2012 | Marti Sala et al. | 198/384 |
| 8,123,024 B2 * | 2/2012 | Yagyu et al. | 198/757 |
| 8,360,270 B1 * | 1/2013 | McClosky et al. | 221/2 |
| 2008/0277323 A1 | 11/2008 | Stovring | |

FOREIGN PATENT DOCUMENTS

| | | |
|---|---|---|
| DE | 199 25 989 A1 | 12/2000 |
| EP | 0 091 856 A1 | 10/1983 |
| EP | 0 629 571 A1 | 12/1994 |
| EP | 0 849 197 A1 | 6/1998 |
| EP | 1 650 143 A1 | 4/2006 |
| FR | 2 310 164 A | 12/1976 |
| GB | 907 997 | 10/1962 |
| WO | 03/086666 A1 | 10/2003 |
| WO | 2006/079561 A1 | 8/2006 |
| WO | 2006/125436 A1 | 11/2006 |

* cited by examiner

APPARATUS AND METHOD FOR FEEDING USED OBJECTS

BACKGROUND OF THE INVENTION

1. Field of the Invention

The present invention relates to an apparatus and a method for feeding used objects, in particular used beverage containers (in the following referred to as "UBCs"), to a recording and/or sorting unit, wherein the objects are supplied on receiving means and forwarded one by one with a predetermined orientation on a feeding conveyor.

2. Description of Related Art

Breweries, bottlers and manufacturers of mineral water, soft drinks and the like frequently use non refillable bottles made of plastic, glass or metal cans that are part of a deposit/return system, e.g. the PET-cide system in Germany (PET is short for polyethylene terephthalate and PET is a thermoplastic polymer resin of the polyester family). Each UBC represents a deposit fee that has an effect on manufacturers, distributors and consumers motivating the consumers to return the UBCs in the shops, where the returned UBCs either are counted and registered in RVM's (Reverse Vending Machines), or manually accepted by the cashier whereby the consumer gets the deposit fee back. In either case the UBCs are transported to central counting centers, where the UBCs are counted and registered once again and sorted into the different material fractions e.g. PET, glass, aluminum and steel.

Based upon the counting and registration at the counting centre the manufacturers and/or distributors are invoiced for the deposit fee, which amount is collected by the shops. After counting and registration the UBCs are devaluated in e.g. compactors, shredders etc. and the residual products are sent to recycling. Used beverage containers may also be referred to as "empties".

A system for processing of packages, such as recyclable UBCs, is known from WO 2006/125436 A1. In this system, UBCs are recorded, counted and sorted in a counting and sorting machine. Large numbers of UBCs can be handled per time unit. Due to the high capacity of this system, it may be referred to as a high speed counting and sorting machine. In this system the UBCs are supplied in a receiving container and picked up and advanced on conveyors by means of carriers on said conveyors, said carriers thereby applying a force to the packages. The packages are subsequently fed singly to a recording unit at a high speed. Some of the returned UBCs are possibly glass bottles, and if the share of glass bottles in the returned packages is too large, the feeding unit is unable to provide a sufficient number of packages to the recording unit to utilize the maximum capacity of this known system due to the fragility of the glass bottles.

A feeding system for bottles is known from U.S. Pat. No. 4,489,820. In this system, upright bottles are transferred from laterally adjacent rows on a feed conveyor into a single row of bottles on a downstream conveyor. The bottles align in a single row due to passing a number of conveyors with increasing speed. No external forces are applied to the bottles; they move across the conveyors solely due to gravity. However, the system applies to upright bottles identical in shape and would be unsuitable for e.g. bottles of different shapes in a horizontal position.

For feeding bottles or cans to the recording unit in a reverse vending system, the bottles must be fed singly and orientated correctly. If the high capacity system described in International Patent Application Publication WO 2006/125436 A 1 and corresponding U.S. Patent Application Publication 2008/0277323 is not suitable for this, the alternative is to arrange that UBCs are supplied to a receiving table and orientated manually and placed on a conveyor. This is not considered a cost-effective solution just as this solution is limited in capacity both in the amount of recyclable UBCs which can be handled at the time and the speed at which the UBCs can be processed. Moreover, a manual solution for feeding the UBCs to the recording and sorting units involves a labor intensive and monotone working operation.

SUMMARY OF THE INVENTION

Considering the aspects described above, it is an object of the present invention to provide an automated feeding system which is simple in functionality and cost-effective in production and in use.

This is achieved by an apparatus for feeding objects, such as used beverage containers, to a recording and/or sorting unit, wherein the objects are supplied on receiving means and forwarded one by one with a predetermined orientation on at least one feeding conveyor, the receiving means comprises at least one receiving table comprising at least one rotating disk with at least one feeding conveyor provided tangential relative to at least one rotating disk, and with a peripheral barrier essentially circumscribing at least a portion of said receiving table(s).

The receiving table may comprise more rotating disks in a combination with conveyor means transporting the UBCs between the rotary disks. In the preferred embodiment, the one or more disks are provided with a conical inner portion for guiding objects on the disks towards the periphery thereof. The conical portion may cover a maximum 10% of the area of the disk, such as a maximum 25% of the area of the disk, such as a maximum 50% of the area of the disk, such as a maximum 75% of the area of the disk, such as a maximum 90% of the area of the disk, such as 100% of the area of the disk. Thus, in one embodiment of the invention one or more of the rotating disks is a cone. In another embodiment of the invention a pole is provided in the center of one or more of the rotating disks. Said pole is preferably provided to prevent objects from being located in the centre of a rotating disk where no centrifugal forces can guide said object towards the periphery of the rotating disk.

Accordingly, by the invention, there is also provided a method of feeding recyclable UBCs, to a recording and/or sorting unit, by supplying the objects on receiving means and forwarding the objects one by one with a predetermined orientation on at least one feeding conveyor.

Once supplied on the receiving means, the objects are rotated on at least one rotating disk and thereby aligned along a barrier circumscribing at least a portion of said at least one delivery disk so that the objects are aligned and forwarded on a feeding conveyor which is tangentially arranged relative to a rotating disk.

The predetermined orientation of the UBCs on a feeding conveyor is preferably with the longitudinal axis of the UBCs substantially parallel with the direction of movement and substantially parallel with the longitudinal axis of the feeding conveyor. By the invention, there is provided a simple and efficient feeding system for use in a deposit/return system for UBCs, such as bottles or cans. The apparatus according to the invention allows for a gentle handling for the UBCs, which makes the feeding system according to the invention suitable for both glass, plastic or metal packages and any mixture thereof. Besides the versatility of the feeding apparatus according to the invention, it is found that the apparatus can be designed to provide high throughput capacity. The actual capacity can be optimized by selecting a proper combination of diameter and speed of rotating disk(s), and/or speed of conveyors connecting the rotary disks.

Another advantage by an apparatus according to the invention is that a feeding system which is compact in size may be provided. For instance, the apparatus according to the invention does not necessarily have to be aligned with the conveying direction of the recording and sorting units. Thus, a more flexible solution is provided with the apparatus according to the invention which has a smaller footprint on the floor. By choosing an appropriate diameter of the delivery disk relative to the size of the UBCs to be processed thereon and the amount, an efficient and reliable feeding system is provided.

In a preferred embodiment, the receiving table comprises two or more rotating disks. The disks provided with tangential feeding conveyors may then be termed delivery rotating disks (or just delivery disk), because objects will only be guided (i.e. delivered) onto a feeding conveyor from the delivery disks. Conveyor means are preferably arranged to transport objects from one disk to the other, said conveyor means preferably comprising a forward conveyor band forwarding the objects towards a delivery rotating disk and a return conveyor band returning objects not delivered to a feeding conveyor to the second rotating disk. Hereby, a large capacity of the apparatus may be provided. To further increase the capacity of the invention, additional rotating disks may be provided.

Thus, further embodiments of the invention comprise more than two rotating disks, such as at least three, four, five or at least six rotating disks, preferably comprising conveyor bands forwarding the objects between the disks. Feeding conveyors may be located tangentially to one or more of the rotating disks.

In the preferred embodiment, the feeding conveyor(s) is inclined relative to the substantially horizontal receiving table. Preferably, the barrier circumscribing the receiving table leaves the periphery open where a tangential feeding conveyor is arranged. Hereby, the UBCs are lifted upward as they are taken over by a feeding conveyor and forwarded thereon. This means that should a container be transferred to the conveyor in an unfavorable orientation, this container will most likely fall off the feeding conveyor and return to the receiving table and reprocessed.

In the preferred embodiment means for adjusting the conveying speed of the feeding conveyor(s) and/or the rotation of the disk(s) is comprised. Furthermore, the cross section of the feeding conveyor(s) is preferably substantially V-shaped, thereby helping to maintain the objects in the predetermined orientation.

UBCs in the receiving table will substantially be lying down due to the rotational forces of the rotating disk(s) and/or by the forces exerted by forward and return conveyor bands, i.e., the longitudinal axis of the UBCs will typically be substantially parallel with the horizontal plane of the receiving table. This is true for most UBCs; however, some beverage containers may be designed or changed in a way that the state of equilibrium/point of balance is not with a horizontal longitudinal axis, i.e., the UBCs may be tilted with respect to horizontal. This may be the case if the bottleneck of a bottle is heavy compared to the rest of the bottle. A tilted UBCs may be at least partially overlapping another UBC on the feeding conveyor.

Overlapping UBCs in a scanning unit may result in faulty registration, because overlapping UBCs may be registered as one UBC. Thus, a further object of the invention is to ensure that UBCs are fed one by one. This is achieved by a further embodiment of the invention comprising means for detecting objects that are not lying horizontal. Tilted bottles are inclined compared to horizontal and they may also be inclined compared to the longitudinal axis of a feeding conveyor. Thus, a further embodiment of the invention comprises means for detecting objects inclined compared to the longitudinal axis of a feeding conveyor(s). This is preferably provided by means of at least one photocell arrangement located at a feeding conveyor, said photocell arrangement detecting objects inclined compared to the feeding conveyor. Preferably the photocell arrangement is located below the line of motion of objects at the feeding conveyor.

When an inclined object is detected, it means that there is a risk of two or more overlapping objects. The distance between objects being conveyed on a first conveyor can be increased by transferring the objects to a subsequent second conveyor with a higher conveying speed than the first conveyor. A feeding conveyor in this invention will typically be succeeded by another conveyor before entering a scanning and sorting unit, said another conveyor typically having similar or higher conveying speed compared to the feeding conveyor. If the conveying speed of a feeding conveyor is reduced, the distance between objects on a succeeding conveyor will be increased. Thus, in a further embodiment of the invention the speed of at least one feeding conveyor is reduced temporarily when an object inclined compared to the longitudinal axis of the feeding conveyor is detected. Furthermore, the rotation of at least one rotating disk may be reduced temporarily when an object inclined compared to the longitudinal axis of the feeding conveyor is detected. Temporarily may be a period of time. I.e. when an object, which is inclined compared to the longitudinal axis of a feeding conveyor, is detected, the conveying speed of the feeding conveyor is preferably immediately reduced for a predetermined period of time, such as approximately 1, 2, 3, 4, 5, 6, 7, 8 or 9 seconds or at least 5 or 10 seconds.

It may be found advantageous to provide supply means including a supply conveyor for supplying at least one batch of objects in storage containers and means for discharging a batch of objects from a container onto the receiving table. Hereby, a compact automatic supply of batches of UBCs may be provided.

The apparatus according to the invention may be used for feeding objects of any type, however preferably objects that are substantially rotary-symmetrical around at least one axis, such as rotary-symmetrical around a long axis. Thus, the apparatus according to the invention may be used in connection with recording and/or sorting of many types of objects, preferably used and/or recyclable objects.

The invention will in the following be described in greater detail with reference to the accompanying drawings.

BRIEF DESCRIPTION OF THE DRAWINGS

FIG. 3 is a top view of same, FIGS. 4 a)-c) are schematic side, top and perspective views, respectively, of a second embodiment of the invention, FIGS. 5 a)-c) are schematic side, top and perspective views, respectively, of a third embodiment of the invention, FIGS. 6 a)-c) are schematic side, top and perspective views, respectively, of a fourth embodiment of the invention, FIGS. 7 a)-c) are schematic side, top and perspective views, respectively, of a fifth embodiment of the invention.

FIG. 16 *a*)-*c*) are schematic side, top and perspective views, respectively, of a ninth embodiment of the invention; and FIG. 17 *a*)-*d*) are schematic illustrations of an example of an arrangement for detecting tilted bottles.

DETAILED DESCRIPTION OF THE INVENTION

Figure 1:
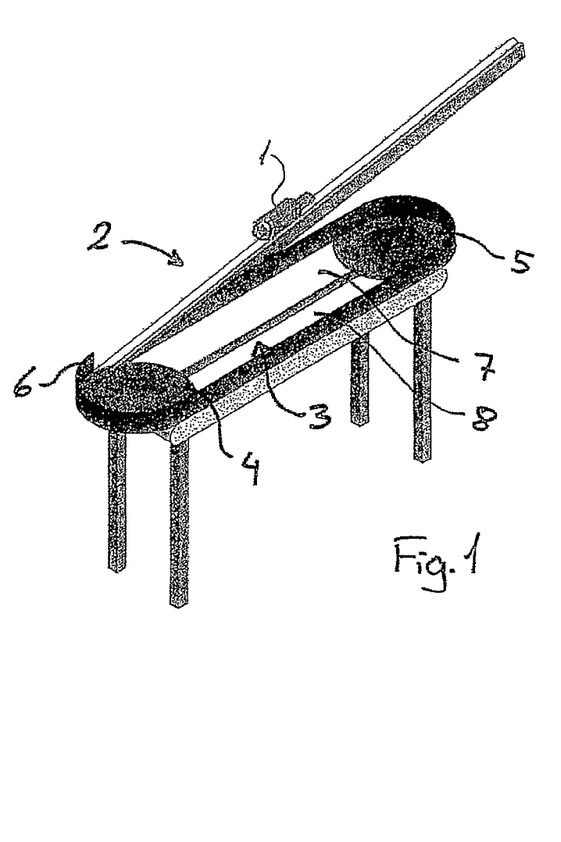
FIG. 1 is a schematic perspective view of an object feeding apparatus according to a first embodiment of the invention.
Figure 2:
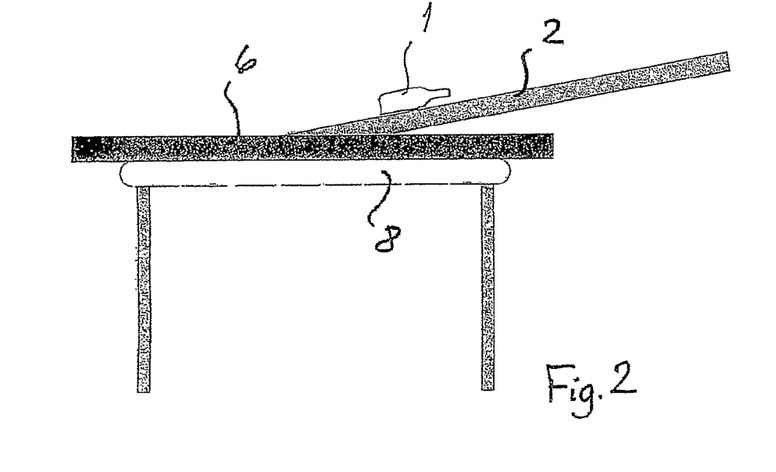
FIG. 2 is a side view thereof.
Figure 3:
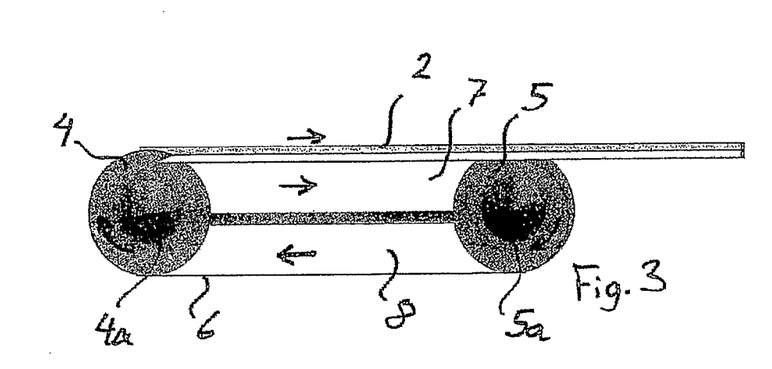

With reference to FIGS. 1 to 3, a preferred embodiment of an apparatus according to the invention is shown, where a receiving table 3 is provided, which has two rotating disks 4, 5 and two conveyor bands 7, 8 therebetween. Around the receiving table 3, a barrier 6 is provided. A feeding conveyor 2 is arranged tangential to the delivery disk 4 so that UBCs 1 gathered along the barrier 6 due to the rotation of the delivery disk are substantially pointing towards conveyor 2 as the objects 1 are transferred from the delivery disk 4 to the feeding conveyor 2 in a continuous movement. The disks 4, 5 and the conveyor bands 7, 8 run in a direction as indicated by the arrows in FIG. 3. Preferably, the disks 4, 5 and the conveyors 7, 8 have a surface generating friction between the UBCs so that the UBCs are moved around on the receiving table 3 towards the feeding conveyor 2.

The UBCs 1, such as glass or plastic bottles and/or metal cans, are supplied onto the receiving table 3 from a bag or the like which is emptied out onto the receiving table 3. The disks 4, 5 and the conveyor bands 7, 8 run in a direction as indicated by the arrows in FIG. 3.

Hereby, the objects 1 are stirred and the outermost are moved towards the barrier 6 and in the direction towards the outlet where the feeding conveyor 2 is arranged at the delivery disk 4. The disks 4, 5 may be provided with a conic inner portion 4*a*, 5*a* for facilitating the movement of the objects towards the periphery of the disks 4, 5. At least a portion of the UBCs 1 are hereby pressed towards the barrier 6 which their longitudinal axis in a generally tangential direction relative to the disk 4. When the UBCs in this position are moved to the outlet, the feeding conveyor 2 takes over the movement and moves the UBCs along a linear path to further processing. The UBCs which are not transferred at this time are simply returned to "another round" on the receiving table 3. Accordingly, these UBCs are returned on the return conveyor band 7 to the second disk 5 and/or directly to the forward conveyor band 8 for a new alignment on the delivery disk 4.

The rotating frequency of a disk is preferably approximately 1 Hz, such as between 0.8 and 1.2 Hz, such as between 0.5 and 1.5 Hz, such as at least 0.1 Hz, such as at least 0.5 Hz, such as at least 1 Hz, such as at least 1.5 Hz, such as at least 2 Hz, such as at least 3 Hz, such as at least 5 Hz.

The capacity of the apparatus according to a preferred embodiment of the invention is at least 50 UBCs per minute, such as at least 100 UBCs per minute, such as at least 150 UBCs per minute, such as at least 200 UBCs per minute, such as at least 300 UBCs per minute, such as at least 400 UBCs per minute, such as at least 500 UBCs per minute, such as between 150 and 300 UBCs per minute. The footprint of the apparatus may be less than 1 m2, such as less than 1.5 m2, such as less than 2 m2, such as less than 2.5 m2, such as less than 3 m2, such as less than 4 m2, such as less than 5 m2.

By the invention, it is realized that other variants of a feeding apparatus may be provided without departing from the scope of the invention as set forth in the accompanying claims.

Figure 4:
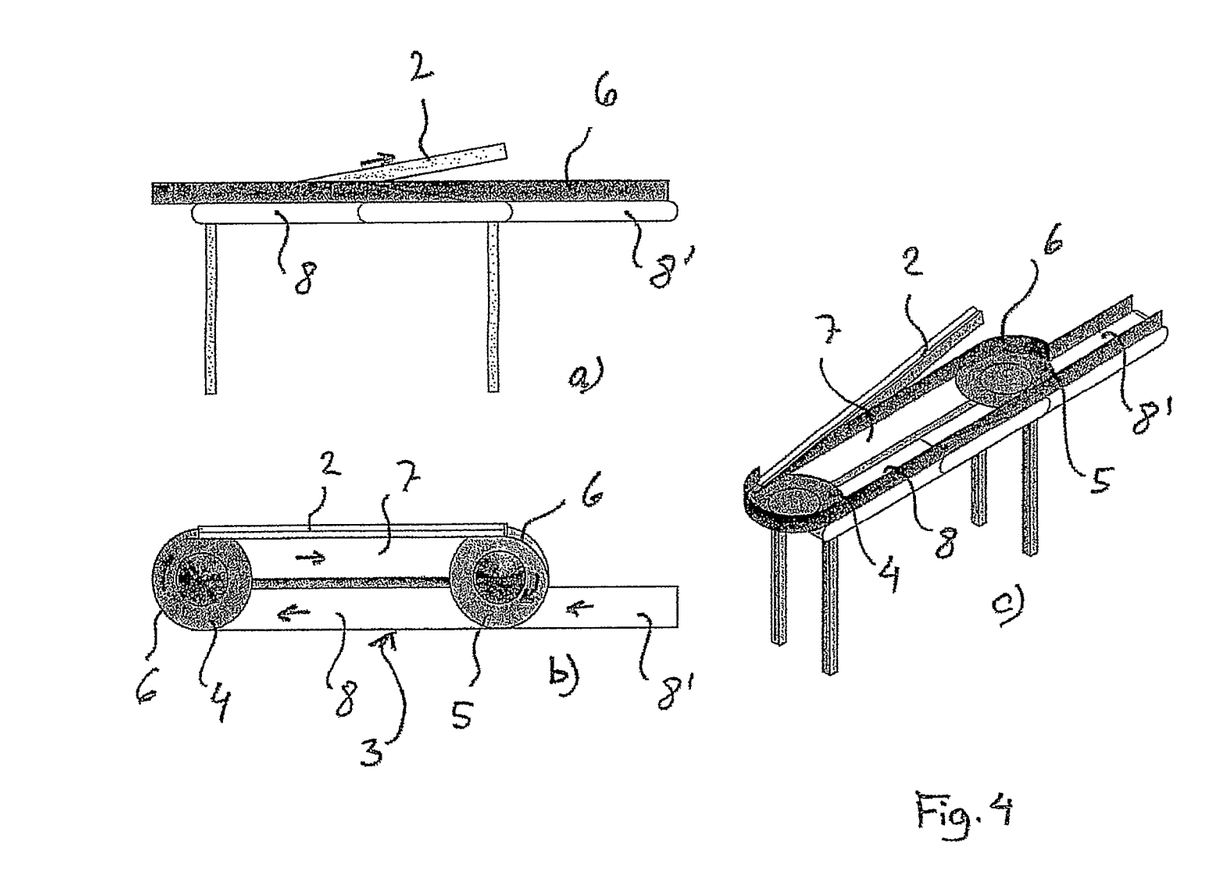

In FIGS. 4 *a*)-*c*) a second embodiment is shown, where a supply conveyor 8' is provided with a transport direction substantially the same as the forward conveyor band 8. The supply conveyor 8' is adapted to deliver UBCs to the second rotating disk 5 on the receiving table 3. As the supplied UBCs arrive on the rotating disk 5, they may be mixed with the UBCs being returned on the receiving table 3.

Figure 5:
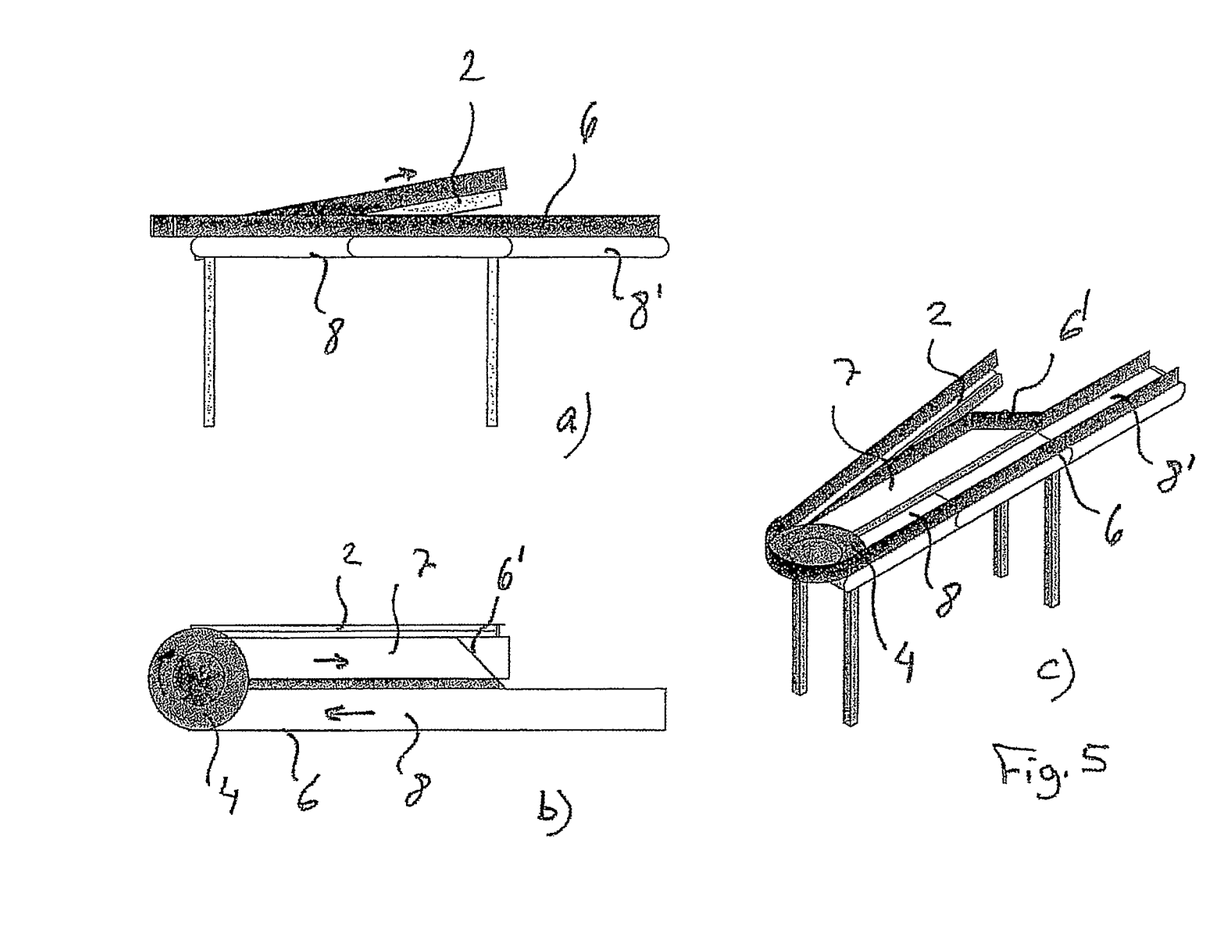

With reference to FIGS. 5 *a*)-*c*), a third embodiment is shown, which is a simplified variant of the second embodiment, where it is realized that the second disk 5 (see FIG. 4) may be omitted and a guiding barrier portion 6' is provided at the end region of the return conveyor band 7 to that the returned UBCs are swept off the return conveyor band 7 and onto the supplying forward conveyor bands 8, 8'. The supply conveyor 8' and the forward conveyor 8 could in a variant hereof be one long conveyor band serving both functions.

Figure 6:
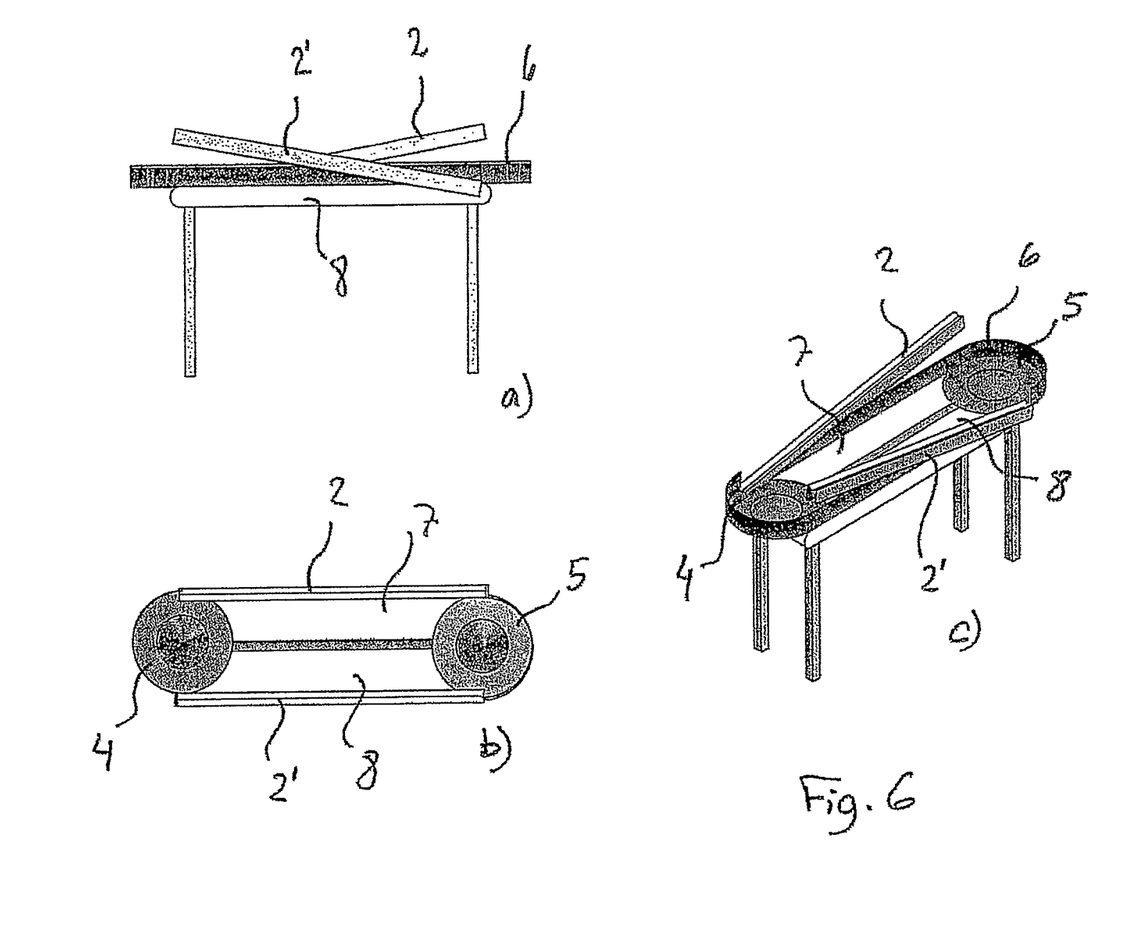

According to a fourth embodiment of the invention as shown in FIG. 6, it is realized that when two rotating disks 4, 5 are provided, two associated feeding conveyors 2, 2' may also be provided tangentially at each disk. This allows for a very compact apparatus with a small footprint compared to its capacity.

Figure 7:
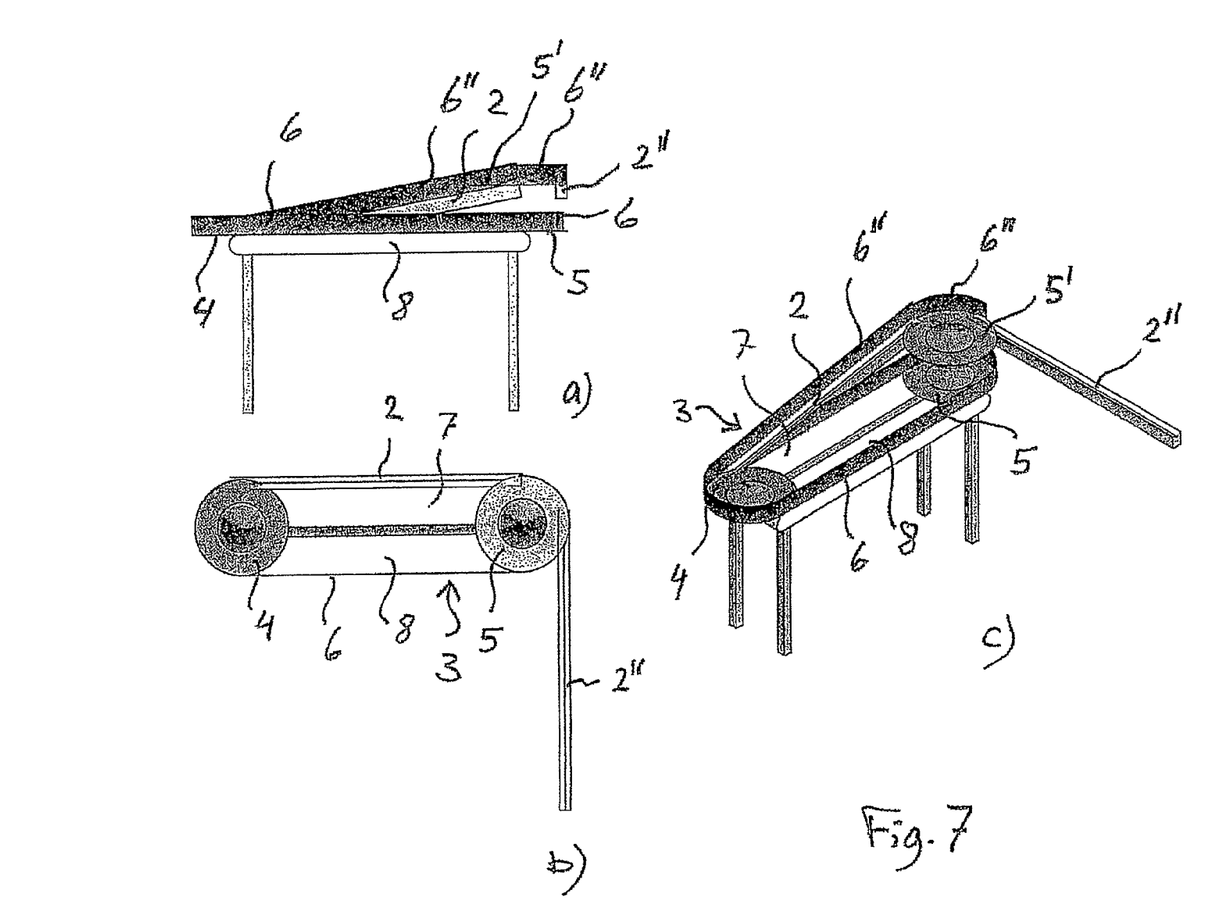

As a fifth example of a variant of the invention, the apparatus as shown in FIG. 7 may be equipped with a separate rotating disk 5', which is placed higher than the receiving table 3.

The feeding conveyor 2 can deliver the UBCs to the periphery of this separate third rotating disk 5'. The separate rotating disk 5' will have its own peripheral barrier 6" along which the UBCs are guided. Depending on the actual length of the barrier 6" as compared to the diameter of the separate rotating disk 5', the UBCs may change direction of movement on a subsequent second feeding conveyor 2" compared to the direction of movement of conveyor 2. This feature will, in combination with a recording and sorting unit, allow for an optimized footprint of the entire machine for processing of objects, such as UBCs.

Figure 8:
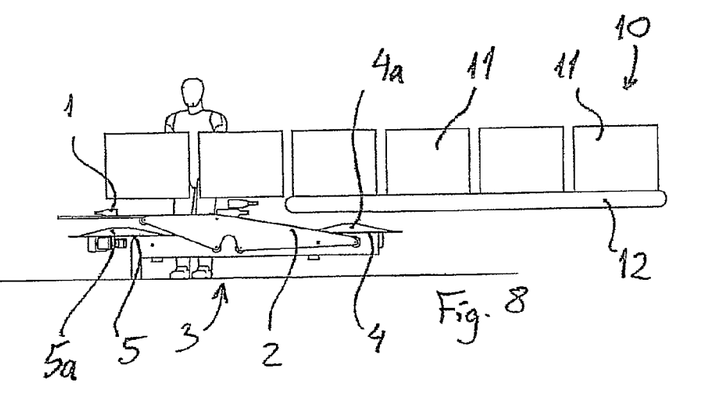
FIGS. 8 to 10 are schematic side, top and perspective views, respectively, of a sixth embodiment of the invention.
Figure 9:
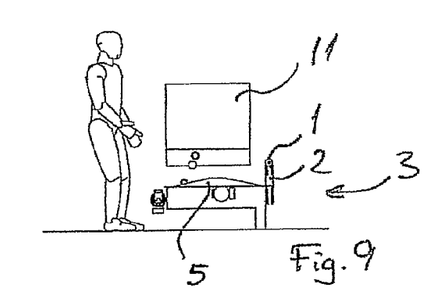
Figure 10:
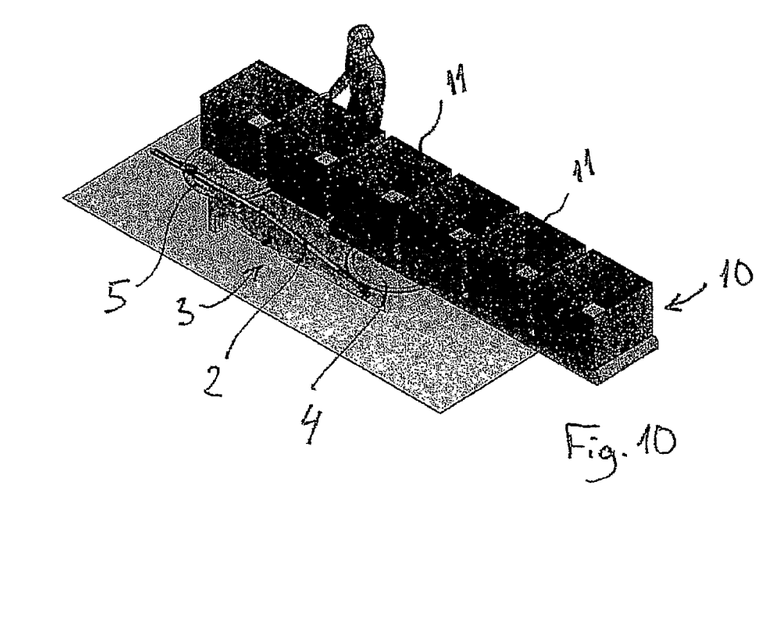

With reference to FIGS. 8 to 10, batch supply means 10 may be provided for supplying UBCs to the receiving table 3. Storage containers 11 with a batch of collected UBCs are forwarded on a supply conveyor 12. Above the receiving table 3, a mechanism (not shown) opens a discharge in the relevant container 11 and the content thereof is discharged onto the receiving table 3. In the FIGS. 8 to 10, the barrier 6 (see, FIGS. 1-7) is not shown. In the FIGS. 8 to 10, the supply conveyor 12 is shown with a supply direction substantially parallel to the feeding conveyor 2. However, it is realized by the invention that any suitable direction of the batch supply may be provided.

Figure 11:
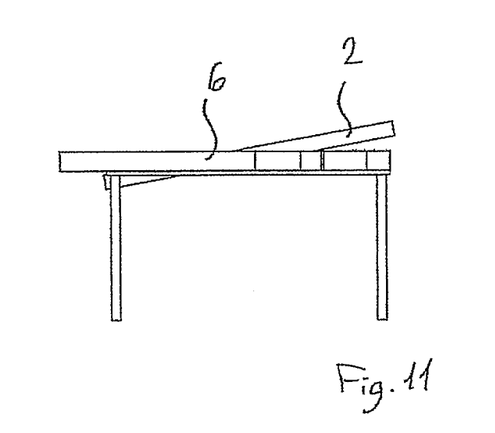
FIGS. 11 to 13 are schematic side, top and perspective views, respectively, of a seventh embodiment of the invention.
Figure 12:
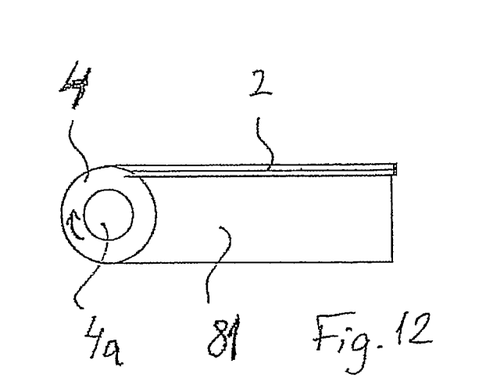
Figure 13:
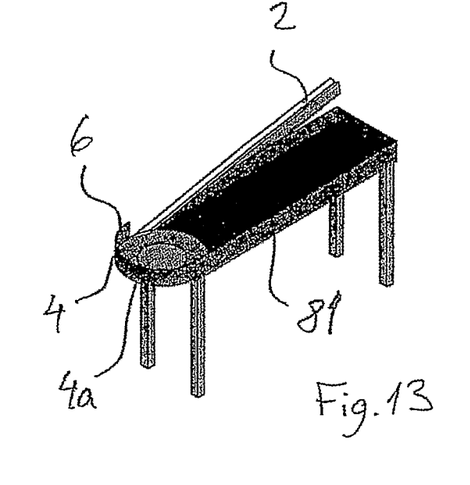

In FIGS. 11 to 13, a seventh embodiment is shown. A rotating delivery disk 4 is provided, which is fed with UBCs (not shown) by a table 81. The packages (UBCs) are deposited on the table 81 and simply forwarded to the disk 4 by an operator pushing the UBCs towards the disk 4. Due to the barrier 6, the UBCs are eventually aligned along this peripheral barrier 6 and delivered onto the feeding conveyor 2. Like above, the disk 4 is preferably provided with a central cone 4*a* for guiding the UBCs towards the periphery of the rotating disk 4. This particularly simple embodiment may be advantageous for small quantity plants.

Figure 15:
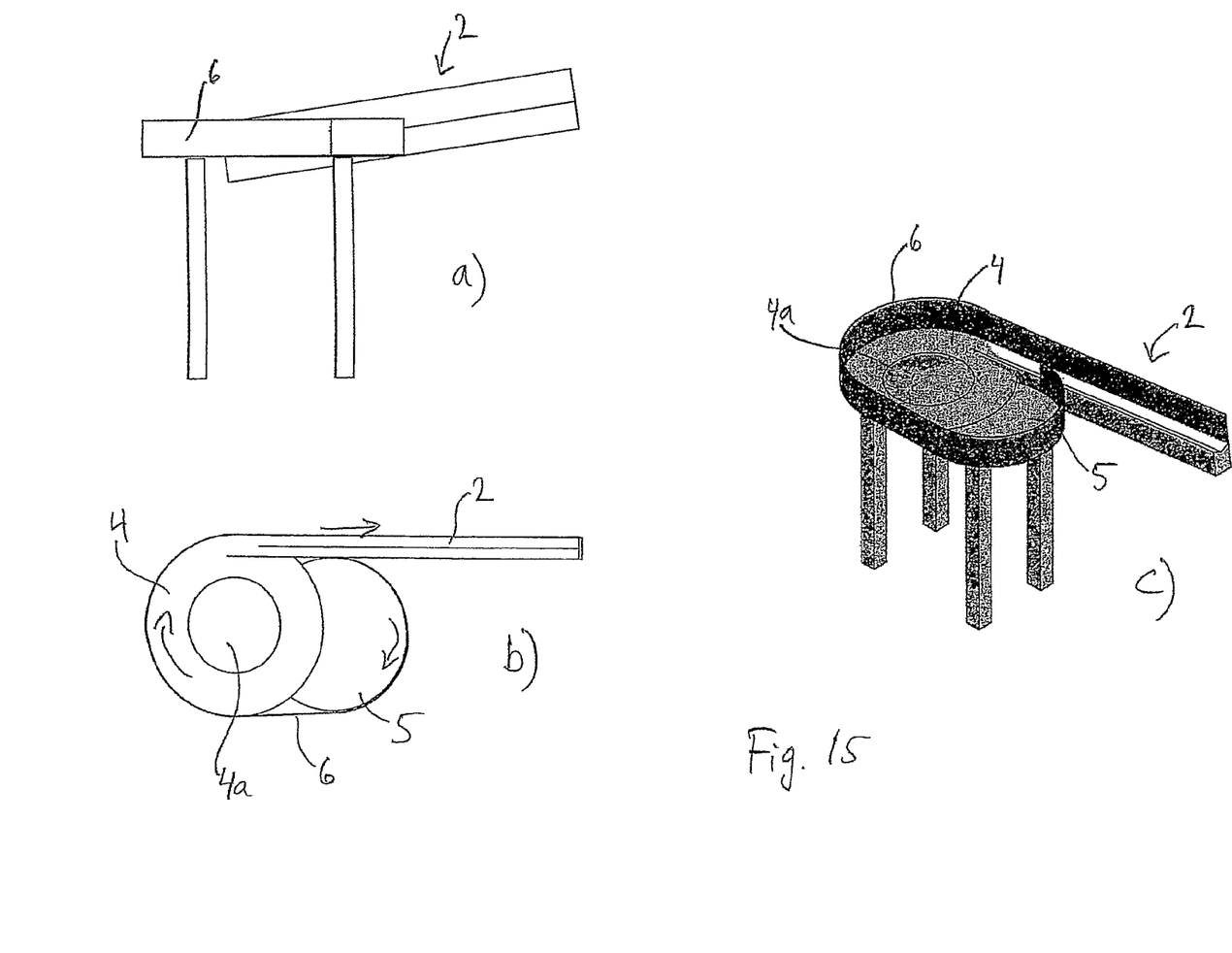

In FIGS. 15 a)-c), an eighth embodiment of the invention is shown. This is a simplified embodiment compared to the embodiment shown in FIGS. 1 to 3. This eighth embodiment has particularly small footprint with two rotating disks 4, 5, however, without the use of conveyors between the disks 4, 5. To avoid the use of said conveyors, the rotating disks 4, 5 are partly overlapping. This helps to reduce the footprint of the apparatus. The rotating delivery disks 4, 5 guide objects towards the barrier 6 and on to the feeding conveyor 2. In this illustrated example, the function of rotating disk 5 is to guide objects towards rotating disk 4. Preferably, rotating disk 4 is overlapping disk 5 as shown in FIG. 15. Disk 4 may be provided with a conical center to help guide the objects towards the barrier. This embodiment may also be provided with more than one tangential feeding conveyor 2.

Figure 16:
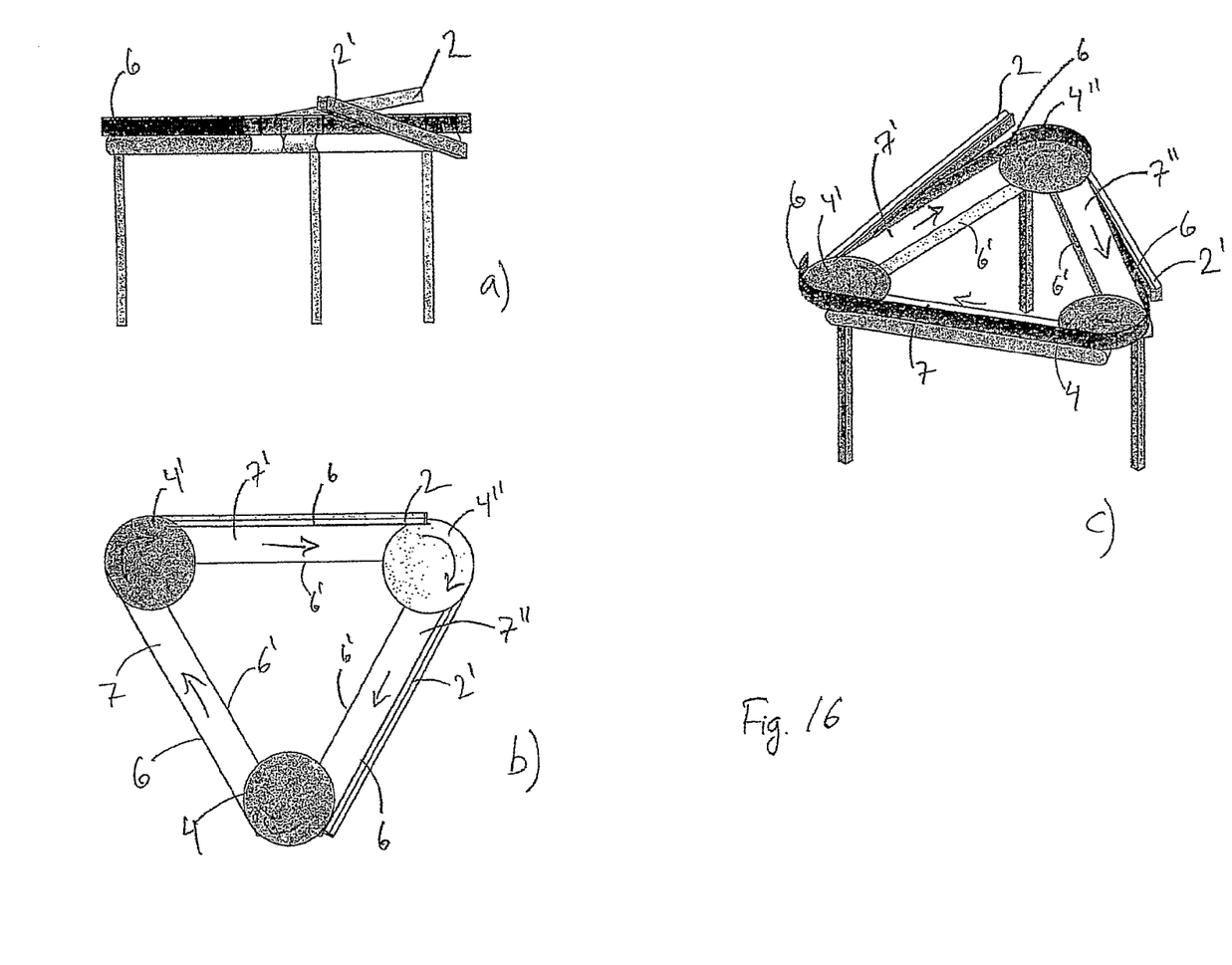

In FIGS. 16 a)-c), a ninth embodiment of the invention is shown with three rotating disks 4, 4', 4". This example is illustrated with two tangential feeding conveyors 2, 2', however, one or three or more feeding conveyors may be provided. Conveyors 7, 7', 7" move objects between the disks 4, 4', 4". A barrier 6 is provided to screen the outside of the conveyors 7, 7', 7" and a barrier 6' is provided to screen the inside of the conveyors 7, 7', 7". Barriers 6, 6' are provided to keep objects from falling off the conveyors 7, 7', 7".

Figure 17:
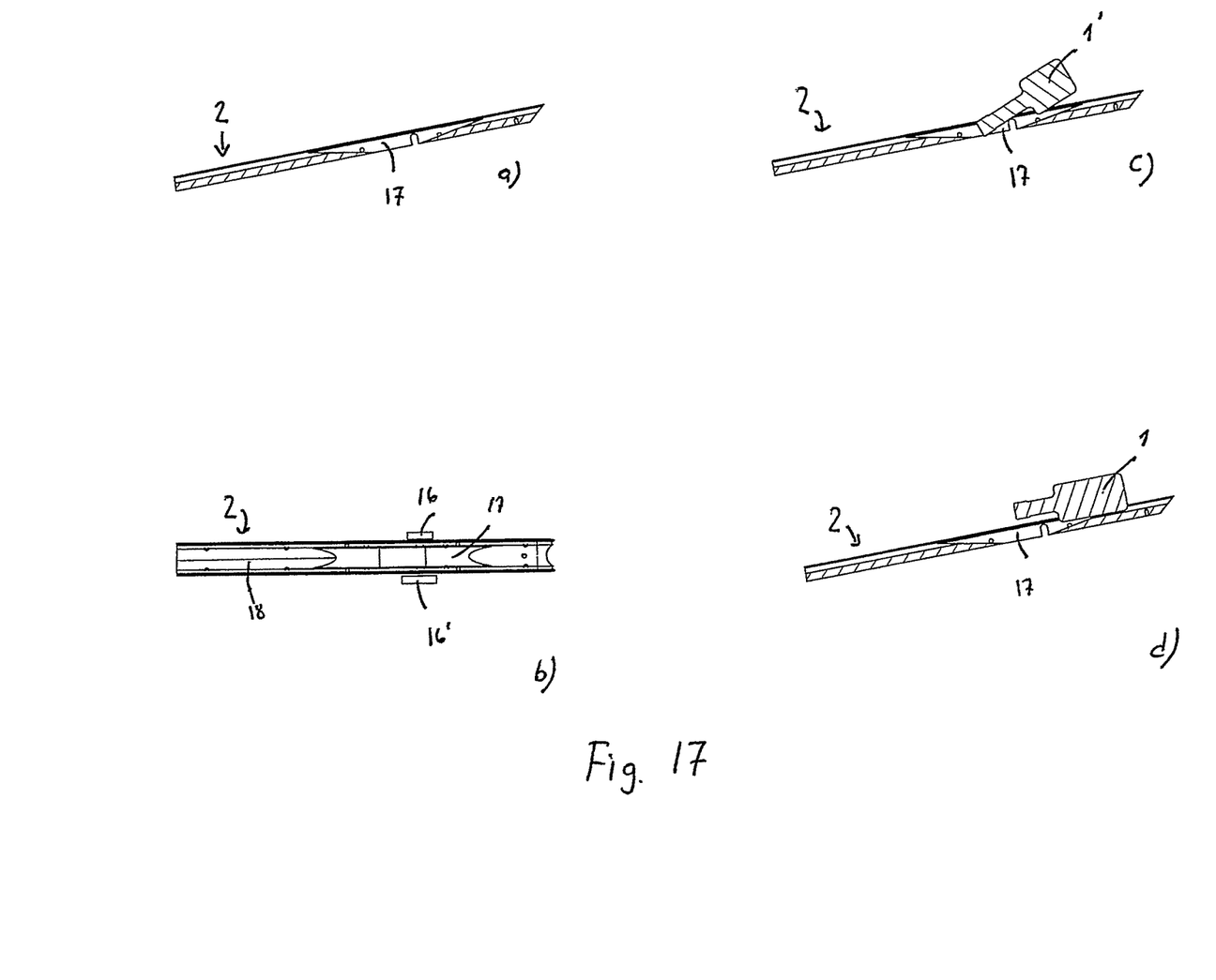

FIGS. 17 a)-d) schematically illustrate an example of a means for detecting inclined objects which is tilted bottles Y in this case. FIGS. 17a, 17c and 17d are longitudinal cross-sections of a feeding conveyor 2. In this example, the feeding conveyor 2 comprises two parallel conveying bands forming a "V" towards each other, i.e., the transverse cross section of the feeding conveyor is substantially V-shaped, and thus, bottles will be conveyed with their longitudinal axis substantially parallel with the groove of this "V". There is preferably a gap between the sides in the "V", i.e., there is preferably a gap in the longitudinal direction of the bottom of the feeding conveyor 2. This is illustrated as 18 in FIG. 17b which is a top view of a feeding conveyor 2. FIG. 17d illustrates how a normal bottle 1 is moving on a feeding conveyor 2. The longitudinal axis of the bottle 1 is substantially parallel with the longitudinal axis of the feeding conveyor 2 and the line of motion of the bottle 1. FIG. 17c illustrates how a bottle Y with a heavy bottleneck is located on a feeding conveyor 2. Due to the heavy bottleneck the bottle Y will be tilted, i.e., the longitudinal axis of the bottle Y is inclined relative to the longitudinal axis of the feeding conveyor 2 and the line of motion. As a result, the bottleneck of the bottle Y may penetrate the gap 18 in the bottom of the feeding conveyor 2. A photocell arrangement 16, 16' is located in a groove 17 below the line of motion of the bottles 1, 1'. The photocell arrangement could be a light emitter 16 and a receiver 16'. The normal bottle 1 will not interfere with the photocell arrangement 16, 16'.

However, the bottleneck of the inclined bottle Y will interfere with the photocell arrangement 16, 16'. Thereby an example of a how to detect an inclined object is provided.

Common to most of the different embodiments, the disks 4, 5 and the conveyor bands 7, 8 run in a direction as indicated by the arrows in the figures. Hereby, the objects 1 are stirred and the outermost are moved towards the barrier 6 and in the direction towards the outlet where the feeding conveyor 2 is arranged at the delivery disk 4. The disks 4, 5 may be provided with a conic inner portion 4a, 5a for facilitating the movement of the objects towards the periphery of the disks 4, 5. At least a portion of the UBCs 1 are hereby pressed towards the barrier 6 which their longitudinal axis in a generally tangential direction relative to the disk 4. When the UBCs in this position are moved to the outlet, the feeding conveyor 2 takes over the movement and moves the UBCs along a substantial linear path to further processing. The UBCs which are not transferred at this time are simply returned to "another round" on the receiving table 3. Accordingly, in some embodiments these UBCs may be returned on the return conveyor band 7 to the second disk 5 and/or directly to the forward conveyor band 8 for a new alignment on the delivery disk 4. Thus, apart from the seventh embodiment which may require manual interaction the apparatus according to the invention is self-depleting, i.e., all objects will eventually be guided onto a feeding conveyor, preferably for subsequent further processing.

Figure 14:
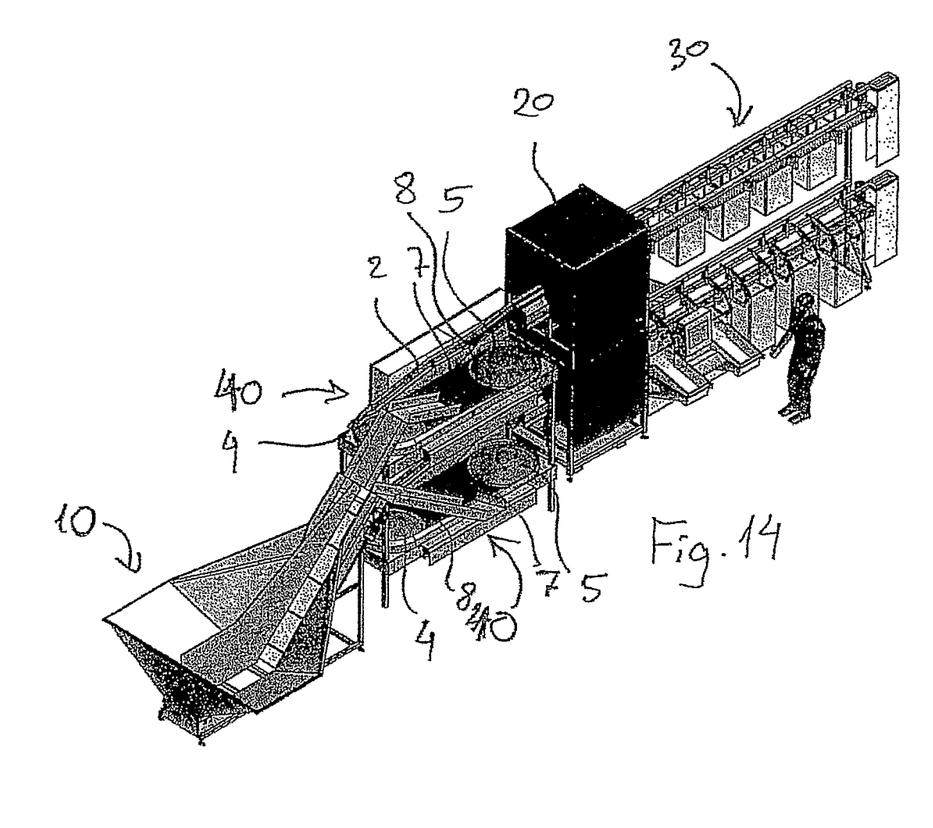
FIG. 14 is a schematic perspective view of an apparatus for identifying and sorting recyclable packages utilizing the present invention, FIG. 15 *a*)-*c*) are schematic side, top and perspective views, respectively, of an eighth embodiment of the invention.

With reference to FIG. 14, an apparatus for identifying and sorting utilizing a plurality of feeding devices is shown. Supply means 10 are receiving the UBCs and supplying them to two disk feeding devices of suitable embodiments of the invention. As shown in the Figure, the UBCs are distributed to two stacked disk feeding devices 40 provided one above the other in order to minimize the foot print of the overall apparatus making the apparatus utilizing the present invention particularly advantageous due to a high capacity with a very compact layout. From the disk feeding devices 40, the UBCs are forwarded through identification means 20 and onwards to sorting means 30. As can be appreciated in the figure, two lines may be provided in different levels, such as above each other in order to provide a compact machine with a very high output.

By the expression that the objects are rotated on a delivery disk used above, it is meant that an angular displacement in a direction substantially perpendicular to the longitudinal axis of the object is produced so that the object is positioned along the barrier circumscribing at least a portion of the delivery disk so that the objects are delivered in alignment with the tangential feeding conveyor and forwarded on the feeding conveyor.

The invention is described above with reference to some currently preferred embodiments. However, it noted that variations of the invention may be provided without departing from the scope of the invention as it is defined in the accompanying claims.

What is claimed is:

1. An apparatus for feeding objects individually to at least one of a recording and sorting unit, comprising:
   a receiving means for receiving objects in bulk and for supplying objects individually, said receiving means having at least one receiving table with at least one rotating disk which is arranged substantially horizontally,
   at least one feeding conveyor on which the supplied objects are forwarded one by one with a predetermined orientation, and where said at least one feeding conveyor is arranged tangentially relative to the at least one rotating disk,
   a peripheral barrier arranged essentially circumscribing at least a portion of said at least one receiving table; and
   wherein said at least one rotating disk displaces objects towards and against said peripheral barrier by means of rotational forces/centrifugal forces for individual withdrawal of objects from said at least one rotating disk by said at least one feeding conveyor.

2. An apparatus according to claim 1, wherein said at least one feeding conveyor is arranged to transport objects to said at least one rotating disk.

3. An apparatus according to claim 2, wherein said at least one feeding conveyor comprises a forward conveyor band for forwarding the objects towards a delivery rotating disk and a return conveyor band returning objects not delivered to a feeding conveyor to a second rotating disk.

4. An apparatus according to claim 1, wherein the at least one receiving table comprises at least two rotating disks.

5. An apparatus according to claim 4, wherein conveyor means are arranged to transport objects from one disk to another.

6. An apparatus according to claim 1, wherein said at least one feeding conveyor is inclined relative to the substantially horizontal receiving table.

7. An apparatus according to claim 1, wherein the barrier circumscribing the receiving table leaves the periphery open where a said feeding conveyor is arranged.

8. An apparatus according to claim 1, wherein a said feeding conveyor is provided tangential to each rotating disk and wherein each feeding conveyor is inclined relative to the receiving table which is substantially horizontal.

9. An apparatus according to claim 1, wherein supply means including a supply conveyor is provided for supplying at least one batch of objects in storage containers and means for discharging a batch of objects from a container onto the receiving table.

10. An apparatus according to claim 1, wherein the at least one rotating disk is provided with a conical inner portion for guiding objects thereon on towards the periphery thereof.

11. An apparatus according to claim 10, wherein the conical inner portion covers up to 100% of the area of the disk.

12. An apparatus according to claim 1, further comprising means for adjusting at least one of the conveying speed of the at least one feeding conveyor and the rotational speed of the at least one rotating disk.

13. An apparatus according to claim 1, wherein a transverse cross section of the at least one feeding conveyor is substantially V-shaped to thereby help maintain the objects in the predetermined orientation.

14. An apparatus according to claim 1, further comprising means for detecting objects that are not lying horizontal.

15. An apparatus according to claim 1, further comprising means for detecting objects inclined relative to a longitudinal axis of the at least on feeding conveyor.

16. An apparatus according to claim 15, wherein the means for detecting comprises at least one photocell arrangement located at at least one feeding conveyor, said photocell arrangement being arranged so as to detect objects that are inclined relative to the longitudinal axis of the at least one feeding conveyor.

17. An apparatus according to claim 16, wherein the photocell arrangement is located below a line of motion of objects on the at least one feeding conveyor.

18. An apparatus according to claim 15, further comprising means for temporarily reducing at least one of the speed of the at least one feeding conveyor and the speed of the at least one rotating disk in response to detection of an object being inclined relative to the longitudinal axis of the at least one feeding conveyor.

19. An apparatus for feeding objects to at least one of a recording and sorting unit, comprising:
  a receiving means for supplying objects having at least one receiving table with at least one rotating disk,
  at least one feeding conveyor on which the supplied objects are forwarded one by one with a predetermined orientation, and is arranged tangentially relative to the at least one rotating disk, and
  a peripheral barrier arranged essentially circumscribing at least a portion of said at least one receiving table,
  wherein a separate third rotating disk is provided above the receiving table, so that objects delivered from a delivery disk to the at least one feeding conveyor are received and redirected onto a second feeding conveyor path by said third rotating disk.

20. A method of feeding objects to a recording and/or sorting unit, comprising the steps of:
  supplying the objects in bulk onto receiving means for supplying objects individually, the receiving means comprising a receiving table having at least one rotating disk which is arranged substantially horizontally, and
  forwarding the objects one by one with a predetermined orientation on at least one feeding conveyor that is tangentially arranged relative to the at least one rotating disk,
  wherein objects supplied to the receiving means are rotated on the at least one rotating delivery disk and displaced toward and against a peripheral barrier circumscribing at least a portion of said receiving table by means of rotational/centrifugal forces so that the objects are aligned and individually forwarded on the at least one feeding conveyor.

21. A method according to claim 20, wherein a separate rotating disk mounted above the receiving table receives the objects from the feeding conveyor and rotates the objects depending on the length of the peripheral barrier compared to the diameter of the separate rotating disk and thereby changes direction of axial movement of the objects.

22. A method according to claim 20, wherein the at least one rotating disk comprises at least two rotating disks.

23. A method according to claim 22, wherein objects are transported from one rotating disk to the other by conveyor means, said conveyor means comprising a forward conveyor band forwarding the objects towards a delivery rotating disk and a return conveyor band returning objects not delivered to a feeding conveyor to a second rotating disk.

24. A method according to claim 23, wherein the at least one feeding conveyor is inclined relative to the receiving table which is substantially horizontal.

25. A method according to claim 20, wherein the objects enter the at least one feeding conveyor through a peripheral opening in the barrier circumscribing the receiving table.

26. A method according to claim 20, wherein the at least one feeding conveyor is positioned tangentially relative to all rotating disks and wherein the at least one feeding conveyor is inclined relative to the receiving table which is substantially horizontal.

27. A method according to claim 20, wherein the objects are guided towards the periphery of a rotating disk by means of a conical inner portion of said rotating disk.

28. A method according to claim 20, wherein the speed of at least one of the at least one feeding conveyor and the at least one rotating disk are adjusted.

29. A method according to claim 20, wherein the objects are maintained in a predetermined orientation by means of a substantially V-shaped transverse cross section of the at least one feeding conveyor.

30. A method according to claim 20, comprising the further step of detecting at least a portion of any objects that are not lying horizontal.

31. A method according to claim 20, comprising the further step of detecting at least a portion of any objected that is inclined relative to a longitudinal axis of the at least one feeding conveyor.

32. A method according to claim 31, wherein said detecting step is performed using at least one photocell arrangement located at the at least one feeding conveyor.

33. A method according to claim 32, wherein the photocell arrangement is located below a line of motion of objects at the at least one feeding conveyor(s).

34. A method according to claim 32, comprising the further step of temporarily reducing the speed of at least one of the at least one feeding conveyor and the at least one rotating disk in response to detection of an object being inclined relative to the feeding conveyor.

* * * * *